Nov. 8, 1938.  D. C. BARDWELL  2,135,695
PROCESS FOR PRODUCING A MIXTURE OF NITROGEN AND HYDROGEN
Filed May 8, 1937
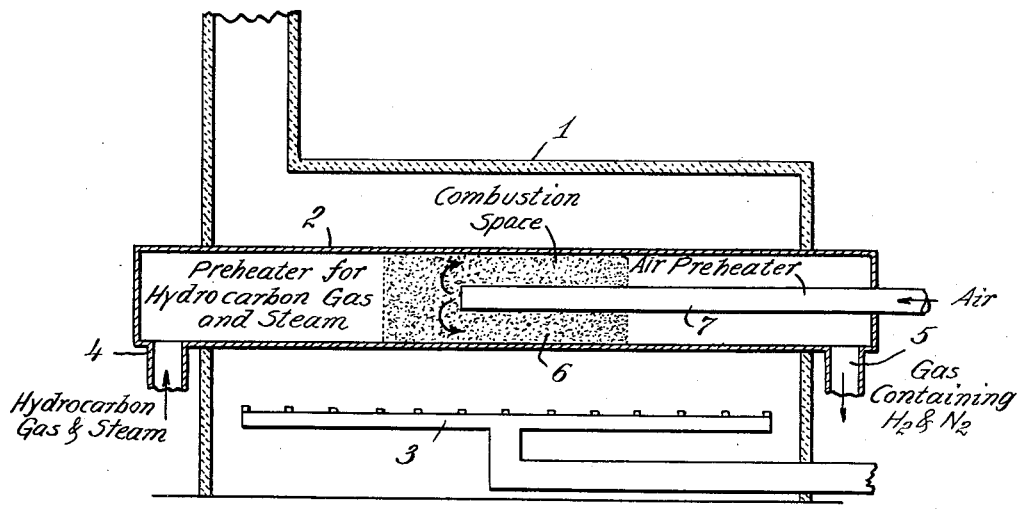
INVENTOR
Dwight C. Bardwell
BY
ATTORNEY

UNITED STATES PATENT OFFICE 2,135,695

PROCESS FOR PRODUCING A MIXTURE OF NITROGEN AND HYDROGEN

Dwight C. Bardwell, Syracuse, N. Y., assignor to The Solvay Process Company, New York, N. Y., a corporation of New York Application May 8, 1937, Serial No. 141,562

3 Claims. (Cl. 23—7)

This invention relates to a process for producing a mixture of nitrogen and hydrogen in determined proportions by the dissociation of hydrocarbon gases and vapors.

It has heretofore been proposed to pass a hydrocarbon gas in contact with heated refractory material. When steam is admixed with the gas thus treated, the hydrocarbon and steam react to form carbon monoxide and hydrogen. This reaction is endothermic and, accordingly, a relatively large amount of heat must be supplied to the reacting gases in order to maintain them at the desired high reaction temperatures. Temperatures which have been proposed heretofore for carrying out this reaction have been in the neighborhood of 1100° C. to 1300° C. It has been proposed to supply the requisite heat by first burning a combustible fuel to heat the refractory material and then, after interrupting this heating stage, introducing the hydrocarbon gas and steam into the heated refractory material. When the temperature of the material had fallen to a point at which the hydrocarbon no longer satisfactorily reacted with the water vapor, the gas making step was interrupted and the refractory material again heated to the desired temperature.

It has also been proposed to produce hydrogen by reaction of hydrocarbons with steam or water vapor by passing the mixture through a pipe externally heated to a high temperature. While such a process lends itself to continuous operation, the high temperatures required for the transfer of the large amounts of heat required through the tube walls makes the process commercially unsatisfactory.

It is an object of this invention to provide a continuous process for the production of a gas containing nitrogen and hydrogen by reaction of a hydrocarbon gas, water vapor and air. It is another object of this invention to provide a continously operable process whereby high temperature heat required for the reaction is supplied by combustion of a portion of the hydrocarbon gas by means of oxygen. It is a further object of this invention to provide an efficient continuously operable process for the production of a gas comprising nitrogen and hydrogen, preferably in the proportions of 1 volume of nitrogen to every 3 volumes of hydrogen which, after removal of impurities, is satisfactory for catalytic treatment to produce ammonia therefrom. Other objects of the invention will in part be obvious and will in part appear hereinafter.

I have discovered that in a process wherein a hydrocarbon gas such as natural gas or coal gas is reacted with steam and oxygen, by highly preheating a mixture of the hydrocarbon gas and steam and separately highly preheating an oxygen-containing gas such as air or air enriched with oxygen, the requisite high temperature for a substantially complete decomposition of the hydrocarbon may be attained by partial combustion of the preheated hydrocarbon gas with the preheated oxygen gas. By employing sufficient air to form a product containing 1 part of nitrogen to every 3 parts of hydrogen and carbon monoxide taken together, a gas which, after removal of the impurities, is suitable for use in the synthetic production of ammonia, may be simply and economically manufactured in a continuously operable process.

In carrying out this invention the hydrocarbon gas admixed with a desired quantity of steam is preheated and introduced into a chamber or combustion space containing highly heated refractory material. At the same time an oxygen-containing gas is separately preheated and then introduced into the same chamber or combustion space containing refractory material, where the oxygen burns a part of the hydrocarbon gas and the unburned hydrocarbon at the high temperatures attained by partial combustion of the preheated gas reacts with the steam to form carbon monoxide and hydrogen. The hot gaseous products are withdrawn from the chamber or combustion space and, if desired, for the subsequent treatment described below of the gas for conversion of the carbon monoxide contained therein, additional steam may be introduced into the gases. After being cooled to a temperature suitable for reaction of the carbon monoxide and steam in contact with the catalyst, the gases are passed into a vessel containing a carbon monoxide conversion catalyst where steam and carbon monoxide react to form carbon dioxide and hydrogen. The gases leaving this catalyst may be further cooled and then passed to a gas holder or may be treated in any desired manner for removal of the carbon dioxide and other impurities.

For a fuller understanding of the nature and objects of this invention reference should be had to the following detailed description taken in conjunction with the accompanying drawing in which is illustrated an apparatus suitable for carrying out the invention. In the drawing a furnace 1 contains a reaction tube 2 arranged for being heated by a burner 3 along the entire length of the tube which lies within the furnace. The ends of the tube project beyond the end walls of the furnace and are provided with a gas inlet 4 and a gas outlet 5. The mid-portion of tube 2 contains a packing 6 of refractory material such as crushed firebrick which occupies about one-third to one-half of the length of tube 2 which is within the furnace. A tube 7 is positioned along the axis of tube 2 and terminates in an open end in packing 6 at about one-fourth of the distance through the packing from the end of the packing nearest inlet 4.

In carrying out the process of this invention employing the apparatus shown in the drawing, a mixture of hydrocarbon gas and steam is introduced through inlet 4 and passed through tube 2. Air or air enriched with oxygen is introduced through tube 7 and injected into the hydrocarbon gas and mixed therewith in the central portion of packing 6. By means of heat supplied by burner 3, the hydrocarbon gas and steam are heated in passing through the inlet side of tube 2 to a temperature of about 1000° C. or higher (1800° F. or higher) before they mix with the air within packing 6. Burner 3 also supplies heat for preheating the air passing through tube 7 to about the same temperature as the hydrocarbon gas-steam mixture is preheated before the air mixes with this gas. The thus preheated gases mix in the central portion of packing 6 and the combustion of a part of the gas by means of the oxygen of the air results in an elevation of temperature to a point at which the hydrocarbon content of the gas is decomposed by means of the steam to form carbon monoxide and hydrogen.

The gas containing hydrogen and nitrogen in desired proportions passes out of tube 2 through outlet 5 and, after being cooled, is passed over a catalyst which acts to promote the reaction of carbon monoxide and steam contained in the gas forming additional hydrogen and carbon dioxide. The gas may then be treated in any desired manner for removal of the carbon dioxide and other impurities. By employing the proper proportions of air and hydrocarbon gas the gaseous product leaving tube 2 will contain about 1 volume of nitrogen to every 3 volumes of hydrogen and carbon monoxide taken together. The reaction between carbon monoxide and steam results in the production of 1 volume of hydrogen for every 1 volume of carbon monoxide. Accordingly, after treatment of the above gas from tube 2 to cause reaction of the carbon monoxide and steam, the resulting gas product will contain about 1 volume of nitrogen for every 3 volumes of hydrogen and, after removal of the carbon dioxide and other impurities, is suitable for catalytic treatment for the synthesis of ammonia.

Since certain changes in carrying out the above process may be made without departing from the scope of the invention, it is intended that all matter contained in the above description and shown in the accompanying drawing shall be interpreted as illustrative and not in a limiting sense. If desired, the packing in combustion space in tube 2 may be a catalyst which promotes the reaction of the hydrocarbon and steam. By suitable control of the conditions of operation of the above described process, a gas may be prepared which is particularly suitable for catalytic treatment to produce alcohols or acids (for example, methanol or acetic acid) and the appended claims are intended to include within their scope such modifications of the process described. The hydrocarbon gas which is mixed with steam and then introduced into tube 2 may be a natural gas or other gas which substantially consists of methane. It may be a gas containing methane mixed with hydrogen and carbon monoxide such as coke oven gas or water gas made from bituminous coal. The amount of undecomposed methane which remains in the product gas of this process will vary according to the temperatures at which the gas is treated. The temperatures maintained in the combustion space in tube 2 should be materially above 1300° C., e. g. about 1325° C., or higher, and are preferably about 1500° C., since by thus operating a gas product may be obtained which contains about 0.5% methane or less on the basis of a dry gas. The invention contemplates that the mixture of hydrocarbon gas and steam shall be preheated to about 1000° C. or higher before being mixed with the preheated air for combustion of a part of the preheated gas. The air is preheated to a temperature in excess of that at which ignition takes place upon mixing the hydrocarbon gas-steam mixture and the air, and it is preferably preheated to substantially the same high temperature as the hydrocarbon gas and steam mixture.

This application is a continuation-in-part of the copending United States applications Serial Nos. 484,268 and 484,269, filed September 25, 1930, in the names of Dwight C. Bardwell and Frank Porter.

I claim:

1. The process of obtaining a mixture of nitrogen and hydrogen in determined proportions by the dissociation of hydrocarbon gases and vapors, which comprises passing a mixture of hydrocarbon gases and steam through a conduit heated to a temperature in excess of 1800° F. and thereby heating said mixture to a temperature in excess of 1800° F., simultaneously heating a volume of air sufficient to supply the required proportion of nitrogen in an independent conduit, to a temperature in excess of that at which ignition will take place, and bringing the gas and air into intimate mixture in a combustion chamber, withdrawing the resultant product and removing the oxides of carbon.

2. In a process for producing a mixture of nitrogen and hydrogen in determined proportions wherein a hydrocarbon gas is reacted with steam to form hydrogen and carbon monoxide and a portion of the gases treated is burned with air to supply heat and to introduce nitrogen into the resulting gas, that improvement which comprises heating a conduit to a temperature in excess of 1800° F., passing a mixture of hydrocarbon gas and steam through the thus heated conduit and thereby heating said mixture to a temperature in excess of 1800° F., simultaneously heating separately from said mixture of hydrocarbon gas and steam a volume of air sufficient to supply the required proportion of nitrogen to a temperature in excess of that at which ignition will take place upon mixing the heated hydrocarbon gas and steam mixture and the air, and bringing the thus heated gas and air into intimate mixture in a combustion chamber.

3. The process of reacting a hydrocarbon gas, steam and air to produce a mixture of nitrogen, hydrogen and carbon monoxide in determined proportions which comprises passing a gas containing said hydrocarbon gas and steam through a conduit heated to a temperature in excess of 1800° F., thereby effecting a partial dissociation of the hydrocarbon gas and steam, simultaneously heating a volume of air adequate to supply the required proportion of nitrogen in an independent conduit and bringing the gas and air into intimate mixture in a combustion zone after they have been heated as aforedescribed to elevated temperatures such that a partial combustion of the gas by the oxygen of the air takes place upon mixing the gas and air and at the high temperature resulting from the combustion of the heated gases, the hydrocarbon gas is substantially completely decomposed and the aforesaid mixture of nitrogen, hydrogen and carbon monoxide is produced.

DWIGHT C. BARDWELL.